(12) United States Patent
Tauchi

(10) Patent No.: US 11,065,915 B2
(45) Date of Patent: Jul. 20, 2021

(54) PNEUMATIC TIRE

(71) Applicant: The Yokohama Rubber Co., LTD., Tokyo (JP)

(72) Inventor: Risa Tauchi, Hiratsuka (JP)

(73) Assignee: The Yokohama Rubber Co., LTD.

( * ) Notice: Subject to any disclaimer, the term of this patent is extended or adjusted under 35 U.S.C. 154(b) by 318 days.

(21) Appl. No.: 16/070,247

(22) PCT Filed: Jan. 12, 2017

(86) PCT No.: PCT/JP2017/000888
§ 371 (c)(1),
(2) Date: Jul. 13, 2018

(87) PCT Pub. No.: WO2017/122748
PCT Pub. Date: Jul. 20, 2017

(65) Prior Publication Data
US 2019/0023076 A1   Jan. 24, 2019

(30) Foreign Application Priority Data

Jan. 15, 2016 (JP) .............................. JP2016-006636

(51) Int. Cl.
*B60C 9/28*    (2006.01)
*B60C 9/20*    (2006.01)
(Continued)

(52) U.S. Cl.
CPC .............. *B60C 9/28* (2013.01); *B60C 9/0007* (2013.01); *B60C 9/18* (2013.01); *B60C 9/185* (2013.01);
(Continued)

(58) Field of Classification Search
CPC ....... B60C 9/28; B60C 11/00; B60C 11/0041; B60C 11/005; B60C 11/0083;
(Continued)

(56) References Cited

U.S. PATENT DOCUMENTS

| 5,318,643 A | 6/1994 | Mizner et al. |
| 8,091,600 B2 | 1/2012 | Kobayashi |

(Continued)

FOREIGN PATENT DOCUMENTS

| JP | H05-063904 | 8/1993 |
| JP | H07-025203 | 1/1995 |

(Continued)

OTHER PUBLICATIONS

Takumi Inoue, JP-2005104437-A, machine translation. (Year: 2005).*

(Continued)

*Primary Examiner* — Robert C Dye
*Assistant Examiner* — Sedef E Paquette
(74) *Attorney, Agent, or Firm* — Thorpe North & Western

(57) ABSTRACT

A pneumatic tire includes cross belts and one or more protective belts provided in the tire radial direction. A width of a widest protective belt is greater than a width of any of the cross belts. In the tire profile, a maximum projection position of the widest protective belt is A, an end position of the widest protective belt is B, a position at which a straight line a passing through position A extending in the direction normal to a tread surface intersects with the tread surface is A', and a position at which a straight line b passing through position B extending in the direction normal to the tread surface intersects with the tread surface is B'. An angle formed between a first straight line that links position A and position B and a second straight line that links position A' and position B' is from 0° to 15°.

8 Claims, 3 Drawing Sheets

(51) Int. Cl.
*B60C 11/00* (2006.01)
*B60C 9/18* (2006.01)
*B60C 11/01* (2006.01)
*B60C 9/00* (2006.01)

(52) U.S. Cl.
CPC .............. *B60C 9/20* (2013.01); *B60C 9/2006* (2013.01); *B60C 11/00* (2013.01); *B60C 11/005* (2013.01); *B60C 11/0083* (2013.01); *B60C 11/01* (2013.01); *B60C 2009/1842* (2013.01); *B60C 2009/2012* (2013.01); *B60C 2009/2016* (2013.01); *B60C 2009/2077* (2013.01); *B60C 2009/2083* (2013.01); *B60C 2200/065* (2013.01)

(58) Field of Classification Search
CPC ......... B60C 11/01; B60C 9/0007; B60C 9/18; B60C 9/185; B60C 9/20; B60C 9/2006; B60C 2200/06; B60C 2200/065; B60C 2200/08; B60C 2009/1842; B60C 2009/2012; B60C 2009/2016; B60C 2009/2077; B60C 2009/2083
USPC ...................................................... 152/209.5
See application file for complete search history.

(56) References Cited

U.S. PATENT DOCUMENTS

| | | | |
|---|---|---|---|
| 2008/0110545 | A1 | 5/2008 | Kobayashi |
| 2008/0264543 | A1 | 10/2008 | Montanaro et al. |
| 2008/0271829 | A1 | 11/2008 | Kobayashi |
| 2009/0126847 | A1 | 5/2009 | Kobayashi |
| 2013/0092302 | A1* | 4/2013 | Okabe .................... B60C 11/01 152/209.16 |
| 2013/0220504 | A1 | 8/2013 | Kurata |
| 2016/0144662 | A1 | 5/2016 | Yamaguchi et al. |

FOREIGN PATENT DOCUMENTS

| | | |
|---|---|---|
| JP | H11-170809 | 6/1999 |
| JP | 2001-301420 | 10/2001 |
| JP | 2003-127613 | 5/2003 |
| JP | 2003-136911 | 5/2003 |
| JP | 2005-104437 | 4/2005 |
| JP | 2006-160216 | 6/2006 |
| JP | 2007-022424 | 2/2007 |
| JP | 2007-062428 | 3/2007 |
| JP | 2015-054626 | 3/2015 |
| WO | WO 2006/066602 | 6/2006 |
| WO | WO 2006/080373 | 8/2006 |
| WO | WO 2006/103831 | 10/2006 |
| WO | WO 2007/010672 | 1/2007 |
| WO | WO 2012/066766 | 5/2012 |
| WO | WO 2014/203908 | 12/2014 |

OTHER PUBLICATIONS

Satoru Isobe, WO-2014203908-A1, machine translation. (Year: 2014).*

International Search Report for International Application No. PCT/JP2017/000888 dated Mar. 21, 2017, 6 pages, Japan.

* cited by examiner

PNEUMATIC TIRE

TECHNICAL FIELD

The present technology relates to a pneumatic tire having a protective belt layer.

BACKGROUND ART

Tires for construction vehicles and tires for industrial vehicles are subjected to heavy loads, so it is desirable that they have excellent durability, and in particular, it is desirable that belt edge separation, or separation between the belt layers and the tread rubber, does not easily occur.

In order to improve resistance to belt edge separation, for example, at least one protective belt made from extensible steel cords is provided outward in the tire radial direction of a plurality of cross belts. At this time, the steel cords of the maximum width protective belt, which is the protective belt having the maximum width in the tire lateral direction (or the protective belt, when these is only one protective belt), and the steel cords of the maximum width belt having the maximum width in the tire lateral direction from among the cross belts are configured to be inclined towards the same side in the tire lateral direction with respect to one direction in the tire circumferential direction. In this way, the strain acting on the edge of the maximum width belt can be reduced, and as a result, the belt-edge-separation resistance can be improved.

However, in the above configuration, the strain in the maximum width belt from among the cross belts can be reduced, but the strain of the maximum width protective belt is increased, and in some cases, separation occurs between the maximum width protective belt and the tread rubber.

On the other hand, in order to improve the belt-edge-separation resistance, a pneumatic tire for a construction vehicle is known in which a plurality of layers of protective belts is provided, with the steel cords of each protective layer mutually intersecting those of the adjacent belts, and a fiber reinforced member is disposed at the two ends of each protective belt so as to wrap each end from the inner circumference side surface to the outer circumferential side surface of each protective belt (see, for example, Japan Unexamined Patent Publication No. 2015-054626).

In the pneumatic tire for a construction vehicle as described above, the movement of the steel cords of the protective belts is effectively reduced by using the configuration of providing a fiber reinforced member wrapping each of the two ends of each of the plurality of layers of the protective belts, so the belt-edge-separation resistance can be improved. However, in this configuration, a fiber reinforced member is provided at both ends of the protective belts, so the structure of the protective belts is complex. Moreover, many fiber reinforced members are added to the protective belts and are a heat source, so providing the fiber reinforced members at both ends of the protective belts causes repeated deformation, and, causes reduction of the adhesion between the rubber and the steel cords due to heat build-up, which is disadvantageous in terms of reducing belt-edge separation.

SUMMARY

The present technology provides a pneumatic tire with improved belt-edge-separation resistance with a configuration that is different from the configuration of providing a fiber reinforced member at each of the two ends of the protective belts.

One aspect of the present technology is a pneumatic tire. The pneumatic tire includes: a plurality of cross belts stacked in a tire radial direction and having steel cords that extend with an inclination angle with respect to a tire circumferential direction, steel cords of belts that are adjacent in the tire radial direction being configured to mutually cross; and at least one protective belt provided outward in the tire radial direction of the cross belts and having steel cords that extend at an angle larger compared with the inclination angle.

A belt width of a maximum width protective belt having a maximum belt width of the at least one protective belt is greater than a belt width of any of the cross belts. In a tire profile when the pneumatic tire is sectioned along the tire radial direction, the maximum width protective belt has a maximum projection position A in the tire radial direction in a shoulder region in the tire lateral direction, an edge of the maximum width protective belt is at edge position B, a straight line a passing through the maximum projection position A and extending in a direction normal to the tread surface of the pneumatic tire intersects the tread surface at a position A' on the tread surface, and a straight line b passing through the edge position B and extending in a direction normal to the tread surface intersects the tread surface at a position B' on the tread surface. An angle formed between a first straight line connecting the maximum projection position A and the edge position B and a second straight line connecting the position A' and the position B' is from 0° to 15°.

In this pneumatic tire, preferably, a distance between the maximum projection position A and the position A' is LA, a distance between the edge position B and the position B' is LB, and 1−LA/LB is from 0 to 0.1.

Also, preferably, the tread rubber of the pneumatic tire includes a base tread outward in the tire radial direction of the protective belt, and a cap tread in contact with the base tread and forming the tread surface, and a distance between a position at which the straight line a intersects a boundary surface of the base tread and the cap tread and the maximum projection position A is referred to as LUA, a distance between a position at which the straight line b intersects the boundary surface of the base tread and the cap tread and the edge position B is referred to as LUB, and 1−LUA/LUB is from 0 to 0.25.

Preferably, a minimum separation distance from a first steel cord at an edge position of each of the cross belts to a second steel cord of a cross belt or the protective layer adjacent to each of the cross belts is equal to or greater than a sum of half a diameter of the first steel cord and half a diameter of the second steel cord, and is equal to or less than the sum of the diameter of the first steel cord and the diameter of the second steel cord.

Preferably, the maximum projection position A is located, in the tire lateral direction, between an edge position of a cross belt that has a smallest belt width from among the cross belts and an edge position of a cross belt that has the largest belt width from among the cross belts.

According to the pneumatic tire as described above, the belt-edge-separation resistance can be improved.

DETAILED DESCRIPTION

A pneumatic tire according to the present technology will be described below in detail.

Figure 1:
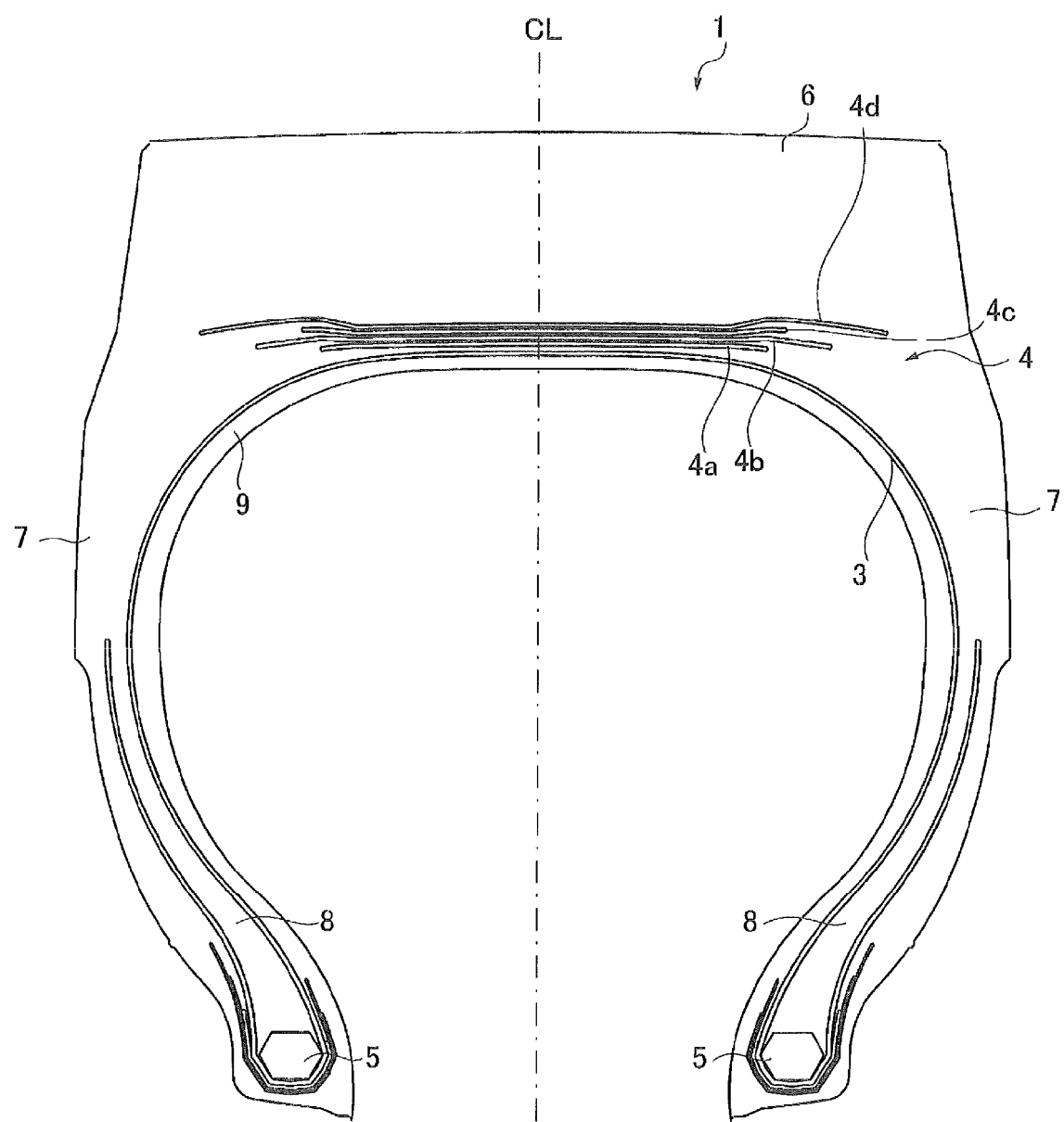
FIG. 1 is a profile cross-sectional view of a pneumatic tire according to an example of the present embodiment.

FIG. 1 is a diagram illustrating a profile cross section of an example of a pneumatic tire (also referred to below as "tire") 1 according to the present embodiment sectioned in a plane including the tire rotation axis of the tire 1 along a tire radial direction. The tire 1 is a heavy duty pneumatic tire.

Heavy duty pneumatic tires in this specification include tires described in Section C of JATMA Year Book 2014 (standards of The Japan Automobile Tyre Manufacturers Association, Inc.) and tires for Classification 1 (dump trucks, scrapers), tires for Classification 2 (graders), tires for Classification 3 (shovel loaders and the like), tires for Classification 4 (tire rollers), and tires for mobile cranes (truck cranes, wheel cranes) described in Section D, or vehicular tires described in section 4 or section 6 of TRA (Tire and Rim Association) Year Book 2013.

The directions and sides in the present specification are defined as follows.

"Tire lateral direction" is the direction parallel to the rotation axis of the pneumatic tire. "Outward in the tire lateral direction" is the direction in the tire lateral direction away from a tire centerline CL that represents the tire equatorial plane with respect to the position of comparison. "Inward in the tire lateral direction" is the direction in the tire lateral direction toward the tire centerline CL with respect to the position of comparison. "Tire circumferential direction" is the direction the pneumatic tire rotates with the rotation axis of the pneumatic tire as the center of rotation. The tire radial direction is a direction orthogonal to the rotation axis of the pneumatic tire. "Outward in the tire radial direction" is the direction away from the rotation axis along the tire radial direction with respect to the position of comparison. "Inward in the tire radial direction" is the direction toward the rotation axis along the tire radial direction with respect to the position of comparison.

Tire Structure

The tire 1 includes a carcass ply 3, a belt layer 4, and a pair of bead cores 5 as framework members, and tread rubber 6, side rubber 7, bead filler rubber 8, and innerliner rubber 9 as rubber layers around the framework members.

At least one layer (one layer in FIG. 1) of carcass ply 3 is mounted between the pair of bead cores 5 of the tire 1. The carcass ply 3 includes a plurality of reinforcing cords extending in the tire radial direction, and is folded back around a bead core 5 from the inner side to the outer side in the tire lateral direction. Additionally, the bead filler rubber 8 is disposed outward in the tire radial direction of the bead core 5, and the bead filler rubber 8 is enveloped by a body portion and the folded back portion of the carcass ply 3.

The belt layer 4 that includes a plurality of layers of belts is provided in a region outward in the tire radial direction of the carcass ply 3 where the tread rubber 6 is provided, so as to be sandwiched between the tread rubber 6 and the carcass ply 3.

The belt layer 4 includes three layers of cross belt 4a, 4b, 4c, and a protective belt 4d.

The cross belts 4a to 4c are provided stacked in the tire radial direction. Steel cords from which the cross belts 4a to 4c are configured are inclined to one side in the tire lateral direction with respect to one direction in the tire circumferential direction. Hereinafter, inclination of two steel cords in the same direction in the tire lateral direction with respect to one direction in the tire circumferential direction is referred to as the steel cords having the same inclination direction with respect to the tire circumferential direction, and inclination towards different sides in the tire lateral direction is referred to as the steel cords having different inclination direction with respect to the tire circumferential direction.

Between cross belts that are adjacent in the tire radial direction, the steel cords have different inclination directions, specifically, they are inclined towards different sides in the tire lateral direction with respect to the tire circumferential direction. Therefore, the cross belts 4a to 4c exhibit a hoop effect on the tire with respect to expansion due to inflation with internal pressure. In the present embodiment, the cross belt 4a on the innermost side in the tire radial direction has the smallest belt width in the tire lateral direction, the cross belt 4c on the outermost side in the tire radial direction has the next smallest belt width, and the cross belt 4b between the cross belt 4a and the cross belt 4c has the largest belt width. Inclination angles of the steel cords of the cross belts 4a to 4c with respect to one direction of the tire circumferential direction are set within a range from, for example, 15° to 30°, in the sequence, for example, 22°, 24°, 22°.

Twisted cord is used as the steel cord of the cross belts 4a to 4c, but there is no particular limitation on its twisted structure. Preferably, the diameter of the steel cord is set from 2.0 mm to 6.0 mm. Also, preferably, the number of ends of the cross belts 4a to 4c is set from, for example, 15 strands per 50 mm to 25 strands per 50 mm, in order to obtain an excellent hoop effect from the belt layer 4.

The protective belt 4d is provided outward in the tire radial direction of the cross belts 4a to 4c. The steel cords of the protective belt 4d extend at a larger angle compared with the inclination angles of the steel cords of the cross belts 4a to 4c, that is, the inclination angle with respect to one direction of the tire circumferential direction. In the present embodiment, one protective belt 4d is provided, but a plurality of protective belts may be provided.

The belt width in the tire lateral direction of the protective belt 4d is greater than the belt width of any of the cross belts 4a to 4c. Note that when a plurality of protective belts is provided, the protective belt with the maximum width from among the belt widths of the protective belts is greater than the belt width of any of the cross belts 4a to 4c, and the two ends in the tire lateral direction of the maximum width protective belt are positioned outward in the tire lateral direction of the two ends in the tire lateral direction of the cross belts 4a to 4c. The steel cords of the maximum width protective belt extend at a larger angle compared with the inclination angles of the steel cords of the cross belts 4a to 4c, that is, the inclination angle with respect to one direction of the tire circumferential direction. When the single protective belt 4d is provided, as in the present embodiment, the protective belt 4d corresponds to the maximum width protective belt.

Twisted cord is used as the steel cord of the protective belt 4d, but there is no particular limitation on its twisted structure. However, steel cord with a more extensible structure than the steel cord of the cross belts 4a to 4c is used. Inclination angle of the steel cords of the protective belt 4d with respect to one direction of the tire circumferential direction is set within a range from, for example, 20° to 35°. Also, the cord diameter of the steel cord of the protective belt 4d is smaller than that of the steel cords of the cross belts 4a to 4c, for example, from about 1.2 mm to 2.0 mm is used. Also, the number of ends of the protective belt 4d is smaller than the number of ends of the cross belts 4a to 4c, for example, the number is set in the range from 10 strands per 50 mm to 20 strands per 50 mm.

The inclination direction with respect to the tire circumferential direction of the steel cords of the protective belt 4d is the same as the inclination direction with respect to the tire circumferential direction of the steel cords of the cross belt 4b, which has the largest belt width from among the cross belts 4a to 4c. Furthermore, the edge positions in the tire lateral direction of the cross belts 4a to 4c and the protective belt 4d are separated in the tire lateral direction by at least 20 mm between adjacent belts.

Figure 2:
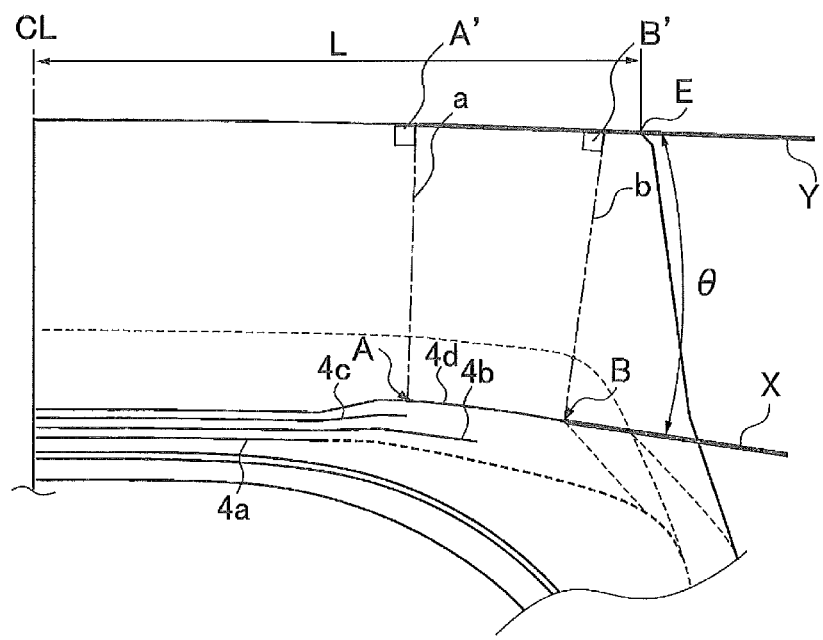
FIG. 2 is a diagram illustrating an example of an area around an edge of belts of the pneumatic tire of the present embodiment.

In such a belt layer 4, the belt layer 4 is configured so that the following relationship is provided between the protective belt 4d and the cross belts 4a to 4c. FIG. 2 is a diagram that describes the area around the belt edges of the tire 1.

As illustrated in FIG. 2, in a tire profile when the tire 1 is sectioned along the tire radial direction, the protective belt 4d that is the maximum width protective belt has a maximum projection position in the tire radial direction in a shoulder region in the tire lateral direction. In a case where this maximum projection position is A, the edge position of the protective belt 4d that is the maximum width protective belt is B, the position at which a straight line a passing through the maximum projection position A and extending in a direction normal to the tread surface of the tire 1 intersects the tread surface is position A', and the position at which a straight line b passing through the edge position B extending in a direction normal to the tread surface intersects the tread surface is position B', then an angle θ formed between a first straight line X passing through the position A and the position B and a second straight line Y passing through the position A' and the position B' is from 0° to 15°. Preferably, the angle is from 3° to 10°, and more preferably, the angle is from 5° to 10°. The inclination of the first straight line X with respect to the tire lateral direction is equal to or greater than that of the second straight line Y. When the distance between a tread end E and the tire centerline CL in the tire lateral direction is L, the shoulder region is the region separated outward in the tire lateral direction by 50% or greater of the distance L from the tire centerline CL.

The inclination of the portion of the protective belt 4d that is outward in the tire lateral direction of the maximum projection position A is equal to or greater than the inclination with respect to the tire lateral direction of the tread surface in the shoulder region. However, the upper limit of the angle θ is 15°, so while the tire is rolling under load, in the portion of the protective belt 4d outward in the tire lateral direction of the maximum projection position A, the shear strain in the tire circumferential direction of the protective belt 4d can be reduced. Therefore, belt edge separation caused by repeated deformation (mechanical deformation) can be reduced. In addition, because the upper limit of the angle θ is 15°, the thickness of the tread rubber 6 at the edge of the protective belt 4d does not become very thick, so heat build-up of the tread rubber 6 can be reduced, and a reduction in belt-edge-separation caused by reduction in adhesion between the rubber and the steel cords can be achieved.

Figure 3:
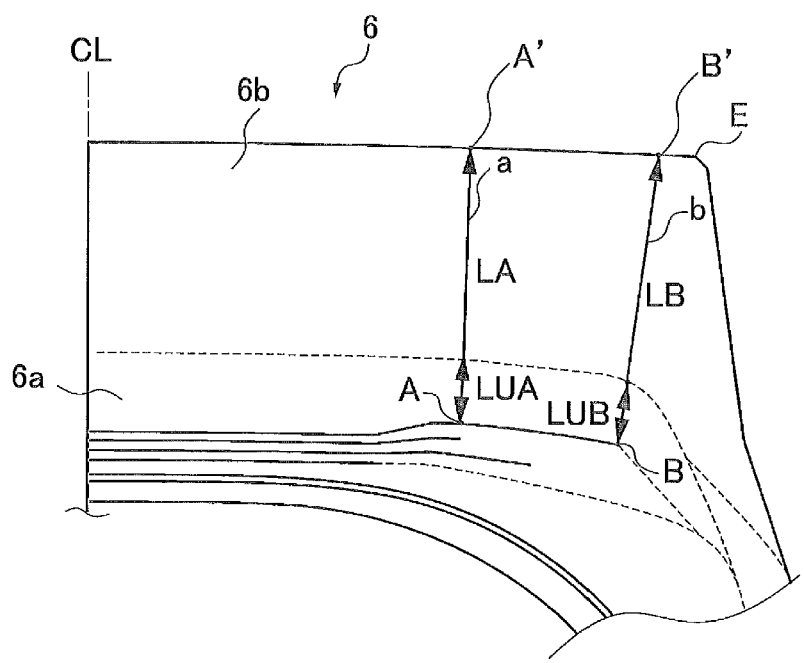
FIG. 3 is a diagram illustrating another example of the area around the edge of the belts of the pneumatic tire of the present embodiment.

At this time, as illustrated in FIG. 3, in a case where the distance between the maximum projection position A and the position A' is LA, and the distance between the edge position B and the position B' is LB, preferably 1−LA/LB is from 0 to 0.1. More preferably, 1−LA/LB is from 0.03 to 0.07. FIG. 3 is a diagram illustrating the area around the edge of the belts of the tire 1 of the present embodiment. By making 1−LA/LB from 0 to 0.1, the distance LB is limited relative to the distance LA (so that LA/LB is not less than 0.9), so the heat build-up of the portion of the tread rubber 6 is reduced, and belt-edge separation caused by reduction in adhesion between the rubber and steel cords due to heat build-up of the rubber can be reduced. In this case, preferably LB−LA is from 0 mm to 8 mm.

Note that as illustrated in FIG. 3, when the tread rubber 6 of the tire 1 includes a base tread (base tread rubber) 6a outward in the tire radial direction of the protective belt 4d and in contact with the protective belt 4d, and a cap tread (cap tread rubber) 6b outward in the tire radial direction of the base tread 6a, in contact with the base tread 6a, and forming the tread surface, in a case where the distance between a position at which the straight line a intersects the boundary surface of the base tread 6a and the cap tread 6b and the maximum projection position A is LUA, and the distance between a position at which the straight line b intersects the boundary surface of the base tread 6a and the cap tread 6b and the edger position B is LUB, then preferably 1−LUA/LUB is from 0 to 0.25. More preferably, 1−LUA/LUB is from 0 to 0.1. By making 1−LUA/LUB from 0 to 0.25, belt-edge-separation can be reduced, and in addition, the reduction in wear resistance caused by making the angle θ from 0° to 15° as described above can be minimized. In this case, preferably LUB−LUA is from 0 mm to 5 mm.

Figure 4:
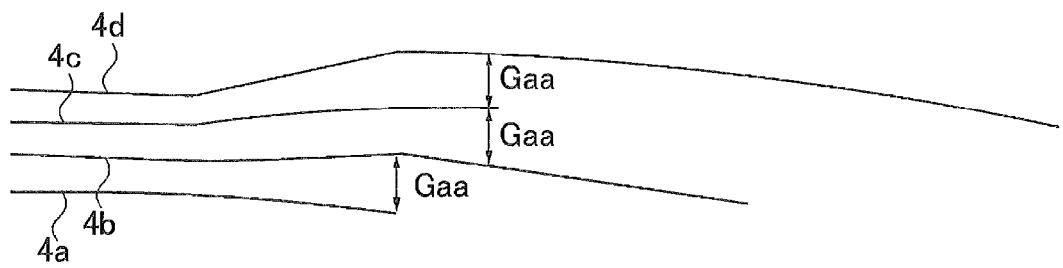
FIG. 4 is a diagram illustrating an example of a belt structure of the pneumatic tire of the present embodiment.

In addition, preferably the minimum separation distance Gaa (see FIG. 4) from a first steel cord at the edge position of each of the cross belts 4a to 4c to a second steel cord of one of the cross belts 4a to 4c or the protective belt 4d that is adjacent to the cross belts 4a to 4c is equal to or greater than the sum of half the diameter of the first steel cord and half the diameter of the second steel cord, and is equal to or less than the sum of the diameter of the first steel cord and the diameter of the second steel cord. Preferably, the minimum separation distance Gaa expressed as a ratio of the total of the diameter of the first steel cord and the diameter of the second steel cord is from 0.5 to 0.8. FIG. 4 is a diagram illustrating an example of the belt structure of the tire 1. By limiting the minimum separation distance Gaa in this way, the shear strain between the layers of the cross belts 4a to 4c can be reduced without raising the edges of the belt outward in the tire radial direction, as is carried out in the related art, so that belt-edge-separation can be reduced. The minimum separation distance Gaa corresponds to the rubber thickness existing between the steel cords of the cross belts 4a to 4c or the protective belt 4d.

Preferably, the maximum projection position A of the tire 1 is located, in the tire lateral direction, between the edge position of the cross belt 4a that has the smallest belt width from among the cross belts 4a to 4c and the edge position of the cross belt 4b that has the largest belt width from among the cross belts 4a to 4c. As a result of this setting of the maximum projection position A, belt-edge separation can be more effectively reduced.

Figure 5A:
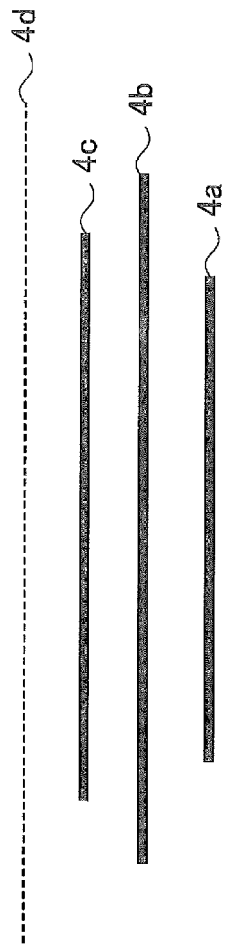
FIGS. 5A to 5C are diagrams each schematically illustrating an example of a belt structure of the pneumatic tire of the present embodiment.
Figure 5B:
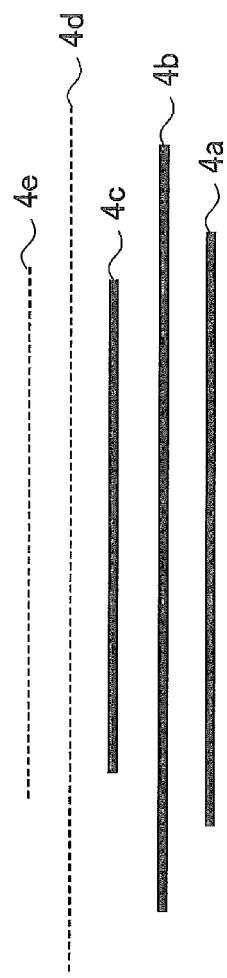

The belt structure of the tire 1 according to the present embodiment includes three cross belts 4a to 4c and one protective belt 4d. In a case where this belt structure including belt widths is represented as illustrated in FIG. 5A, then the tire 1 can also include a protective belt 4e outward in the tire radial direction of the protective belt 4d, in addition to the cross belts 4a to 4c and the protective belt 4d, as illustrated in FIG. 5B. In this case, the belt width of the protective belt 4e is narrower than the cross belt 4b that has the maximum belt width from among the cross belts 4a to 4c.

Figure 5C:
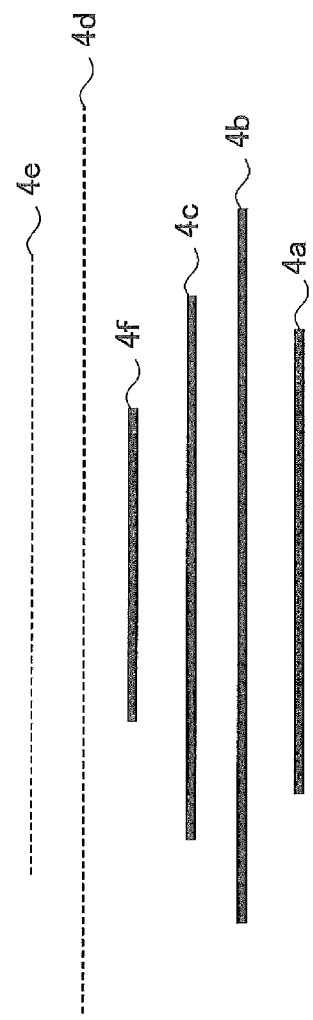

Also, as illustrated in FIG. 5C, four cross belts 4a to 4c, 4f having steel cords that intersect between adjacent cross belts and protective belts 4d, 4e provided outward in the tire radial direction of the cross belt 4f can be provided. In this case, the belt width of the protective belt 4e is narrower than the cross belt 4b that has the maximum belt width from among the cross belts 4a to 4c.

In the belt structures illustrated in FIGS. 5A to 5C, there are three or more cross belts. The inclination direction with respect to the tire circumferential direction of the steel cords of the cross belts are different from the inclination direction with respect to the tire circumferential direction of the steel cords of adjacent belts. Also, the inclination direction with respect to the tire circumferential direction of the steel cords of the maximum width protective belt from among the protective belts is the same as the inclination direction with respect to the tire circumferential direction of the steel cords of the cross belt having the maximum belt width from among the plurality of cross belts. In addition, the inclination angle with respect to the tire circumferential direction of the steel cords of the maximum width protective belt is greater than the inclination angles of the steel cords of the cross belts. Steel cord with a more extensible structure than the steel cord of the cross belts is used as the steel cord of the protective belts. Furthermore, the edge positions in the tire lateral direction of the plurality of cross belts and protective belts are separated in the tire lateral direction by at least 20 mm between adjacent belts.

Examples, Comparative Examples, and Conventional Example

In order to investigate the effect of the tire according to the present embodiment, the tire 1 as illustrated in FIG. 1 (tire with lug grooves) was manufactured making various changes to the belt structure, and the belt-edge-separation resistance was investigated. In addition, the wear resistance was also investigated for some Examples. The size of the tires produced was 18.00R25. These tires were mounted on a rim (TRA specified rim) of rim size 13.00-2.5. The tire pressure was 825 kPa (TRA specified air pressure).

To measure the belt-edge-separation resistance, the tires were driven for 1000 hours at the speed of 5 km/h on a rough (off-road) road surface using a 34 ton weight shovel loader, then the tires were dismantled, and the length of cracking extending in the tire circumferential direction in the portions where belt-edge-separation occurred was measured. The reciprocal of the crack length was converted into an index with the reciprocal of the crack length of the Conventional Example as reference (index 100). Larger index values mean higher belt-edge-separation resistance.

In the case of wear resistance, the amount of wear on the tire was measured after traveling for 1000 hours at a speed of 5 km/h on rough (off-road) road surfaces using the above shovel loader. The groove depth of lug grooves of the tire 1 that are not illustrated on the drawings was measured, and the amount of wear was obtained from the measured groove depth, then the reciprocal of the amount of wear was expressed as an index with the reciprocal of the amount of wear of the Conventional Example as reference (index 100). Larger index values indicate superior wear resistance.

Tables 1 to 3 show the specification of each tire and the evaluation results.

Conventional Example, Examples 1 to 13, and Comparative Examples 1 and 2 in Table 1 had the belt structure illustrated in FIG. 2. The angle θ of the Conventional Example was 20°, larger than 15°.

Also, for the rubber properties of the base tread 6a and the cap tread 6b of Conventional Example, Examples 1 to 13, and Comparative Examples 1 and 2, the hardness and the viscoelastic properties were different, rubber with lower hardness and viscoelasticity being used in the base tread 6a compared with the cap tread 6b. Type-A durometer hardness at room temperature was measured in accordance with Japanese Industry Standard (JIS) K6253-3: 2012. The value of tan δ (60° C.) was measured under conditions with an elongation deformation distortion of 10%±2%, an oscillation frequency of 20 Hz, and a temperature of 60° C. using a viscoelastic spectrometer (available from Toyo Seiki Seisaku-sho, Ltd.) in accordance with JIS K6394:2007.

TABLE 1

|  | Conventional Example | Example 1 | Example 2 | Example 3 | Example 4 | Comparative Example 1 | Comparative Example 2 |
|---|---|---|---|---|---|---|---|
| Angle θ of the first straight line and second straight line | 20° | 15° | 10° | 5° | 0° | −2° | 18° |
| 1 − LA/LB | 0.15 | 0.05 | 0.05 | 0.05 | 0.05 | 0.05 | 0.05 |
| 1 − LUA/LUB | 0.35 | 0.125 | 0.125 | 0.125 | 0.125 | 0.125 | 0.125 |
| Minimum separation distance Gaa between steel cords/(diameter of first steel cord/2 + diameter of second steel cord/2) | 1.0 | 1.0 | 1.0 | 1.0 | 1.0 | 1.0 | 1.0 |
| Belt-edge-separation resistance | 100 | 105 | 110 | 112 | 105 | 100 | 100 |

TABLE 2

|  | Example 3 | Example 5 | Example 6 |
|---|---|---|---|
| Angle θ of the first straight line and second straight line | 5° | 5° | 5° |
| 1 – LA/LB | 0.05 | 0.2 | 0.1 |
| 1 – LUA/LUB | 0.125 | 0.125 | 0.125 |
| Minimum separation distance Gaa between steel cords/(diameter of first steel cord/2 + diameter of second steel cord/2) | 1.0 | 1.0 | 1.0 |
| Belt-edge-separation resistance | 112 | 102 | 105 |

TABLE 3

|  | Example 7 | Example 8 | Example 3 | Example 9 | Example 10 | Example 11 | Example 12 | Example 13 |
|---|---|---|---|---|---|---|---|---|
| Angle θ of the first straight line and second straight line | 5° | 5° | 5° | 5° | 5° | 5° | 5° | 5° |
| 1 - LA/LB | 0.05 | 0.05 | 0.05 | 0.05 | 0.05 | 0.05 | 0.05 | 0.05 |
| 1 - LUA/LUB | 0.35 | 0.25 | 0.125 | 0 | 0.125 | 0.125 | 0.125 | 0.125 |
| Minimum separation distance Gaa between steel cords/(diameter of first steel cord/2 + diameter of second steel cord/2) | 1.0 | 1.0 | 1.0 | 1.0 | 1.5 | 2.0 | 2.5 | 0.8 |
| Wear resistance | 85 | 90 | 95 | 100 | 98 | 96 | 94 | 100 |
| Belt-edge-separation resistance | 112 | 112 | 112 | 112 | 110 | 108 | 104 | 101 |

From Table 1, it can be seen that the belt-edge-separation resistance was increased relative to the Conventional Example by making the angle θ from 0° to 15°.

From Table 2, it can be seen that making 1–LA/LB from 0 to 0.1 is desirable from the point of view of improvement in belt-edge-separation resistance.

From Examples 3 and 7 to 9 of Table 3, it can be seen that making 1–LUA/LUB from 0 to 0.25 is desirable from the point of view of improvement in belt-edge-separation resistance, and in addition, it is possible to minimize the reduction in wear resistance.

From Examples 3 and 10 to 13 of Table 3, it can be seen that the belt-edge-separation resistance can be improved by making the minimum separation distance Gaa from 1 to 2 times the diameter of the first steel cord/2+diameter of the second steel cord/2.

The foregoing has been a detailed description of the pneumatic tire according to embodiments of the present technology. However, the pneumatic tire according to the present technology is not limited to the above embodiments or examples, and may be enhanced or modified in various ways within the scope of the present technology.

The invention claimed is:

1. A pneumatic tire, comprising:
a plurality of cross belts stacked in a tire radial direction, having steel cords that extend with an inclination angle with respect to a tire circumferential direction, steel cords of belts among the cross belts that are adjacent in the tire radial direction being configured to mutually cross; and
at least one protective belt provided outward in the tire radial direction of the cross belts, having steel cords that extend at an angle larger compared with the inclination angle; wherein
a belt width of a maximum width protective belt having a maximum belt width of the at least one protective belt is greater than a belt width of any of the cross belts, in a tire profile when the pneumatic tire is sectioned along the tire radial direction,
the maximum width protective belt has a maximum projection position (A) in the tire radial direction in a shoulder region in a tire lateral direction,
an edge of the maximum width protective belt is at an edge position (B),
a straight line (a) passing through the maximum projection position (A) and extending in a direction normal to the tread surface of the pneumatic tire intersects the tread surface at a position (A') on the tread surface, and
a straight line (b) passing through the edge position (B) and extending in a direction normal to the tread surface intersects the tread surface at a position (B') on the tread surface,
an angle formed between a first straight line connecting the maximum projection position (A) and the edge position (B) and a second straight line connecting the position (A') and the position (B') is from 3° to 15°,
the first straight line inclines at a greater angle than the second straight line with respect to the tire lateral direction, the first straight line and the second straight line having a same inclination direction with respect to the tire radial direction, and
a distance between the maximum projection position (A) and the position (A') being LA, a distance between the edge position (B) and the position (B') being LB, and 1-LA/LB being from 0 to 0.1.

2. The pneumatic tire according to claim 1, 1-LA/LB is from 0 to 0.07.

3. The pneumatic tire according to claim 1, wherein a minimum separation distance from a first steel cord at an edge position of each of the cross belts to a second steel cord of a cross belt or the protective layer adjacent to each of the cross belts is equal to or greater than a sum of half a diameter of the first steel cord and half a diameter of the second steel cord, and is equal to or less than the sum of the diameter of the first steel cord and the diameter of the second steel cord.

4. The pneumatic tire according to claim 1, wherein the maximum projection position (A) is located, in the tire lateral direction, between an edge position of a cross belt that has a smallest belt width from among the cross belts and an edge position of a cross belt that has a largest belt width from among the cross belts.

5. A pneumatic tire, comprising:
a plurality of cross belts stacked in a tire radial direction, having steel cords that extend with an inclination angle with respect to a tire circumferential direction, steel cords of belts among the cross belts that are adjacent in the tire radial direction being configured to mutually cross; and at least one protective belt provided outward in the tire radial direction of the cross belts, having steel cords that extend at an angle larger compared with the inclination angle; wherein a belt width of a maximum width protective belt having a maximum belt width of the at least one protective belt is greater than a belt width of any of the cross belts, in a tire profile when the pneumatic tire is sectioned along the tire radial direction, the maximum width protective belt has a maximum projection position (A) in the tire radial direction in a shoulder region in a tire lateral direction, an edge of the maximum width protective belt is at an edge position (B), a straight line (a) passing through the maximum projection position (A) and extending in a direction normal to the tread surface of the pneumatic tire intersects the tread surface at a position (A') on the tread surface, and a straight line (b) passing through the edge position (B) and extending in a direction normal to the tread surface intersects the tread surface at a position (B') on the tread surface, an angle formed between a first straight line connecting the maximum projection position (A) and the edge position (B) and a second straight line connecting the position (A') and the position (B') is from 0° to 15°, a tread rubber of the pneumatic tire includes a base tread outward in the tire radial direction of the protective belt, and a cap tread in contact with the base tread and forming the tread surface, and a distance between a position at which the straight line (a) intersects a boundary surface of the base tread and the cap tread and the maximum projection position (A) is referred to as LUA, a distance between a position at which the straight line (b) intersects the boundary surface of the base tread and the cap tread and the edge position (B) is referred to as LUB, and 1-LUA/LUB is from 0 to 0.25.

6. A pneumatic tire, comprising:

a plurality of cross belts stacked in a tire radial direction, having steel cords that extend with an inclination angle with respect to a tire circumferential direction, steel cords of belts among the cross belts that are adjacent in the tire radial direction being configured to mutually cross; and at least one protective belt provided outward in the tire radial direction of the cross belts, having steel cords that extend at an angle larger compared with the inclination angle; wherein a belt width of a maximum width protective belt having a maximum belt width of the at least one protective belt is greater than a belt width of any of the cross belts, in a tire profile when the pneumatic tire is sectioned along the tire radial direction, the maximum width protective belt has a maximum projection position (A) in the tire radial direction in a shoulder region in a tire lateral direction, an edge of the maximum width protective belt is at an edge position (B), a straight line (a) passing through the maximum projection position (A) and extending in a direction normal to the tread surface of the pneumatic tire intersects the tread surface at a position (A') on the tread surface, and a straight line (b) passing through the edge position (B) and extending in a direction normal to the tread surface intersects the tread surface at a position (B') on the tread surface, an angle formed between a first straight line connecting the maximum projection position (A) and the edge position (B) and a second straight line connecting the position (A') and the position (B') is from 0° to 15°, a distance between the maximum projection position (A) and the position (A') is LA, a distance between the edge position (B) and the position (B') is LB, and 1-LA/LB is from 0 to 0.1, a tread rubber of the pneumatic tire includes a base tread outward in the tire radial direction of the protective belt, and a cap tread in contact with the base tread and forming the tread surface, and a distance between a position at which the straight line (a) intersects a boundary surface of the base tread and the cap tread and the maximum projection position (A) is referred to as LUA, a distance between a position at which the straight line (b) intersects the boundary surface of the base tread and the cap tread and the edge position (B) is referred to as LUB, and 1-LUA/LUB is from 0 to 0.25.

7. The pneumatic tire according to claim 6, wherein a minimum separation distance from a first steel cord at an edge position of each of the cross belts to a second steel cord of a cross belt or the protective layer adjacent to each of the cross belts is equal to or greater than a sum of half a diameter of the first steel cord and half a diameter of the second steel cord, and is equal to or less than the sum of the diameter of the first steel cord and the diameter of the second steel cord.

8. The pneumatic tire according to claim 7, wherein the maximum projection position (A) is located, in the tire lateral direction, between an edge position of a cross belt that has a smallest belt width from among the cross belts and an edge position of a cross belt that has a largest belt width from among the cross belts.

* * * * *